United States Patent [19]

Suzuki

[11] Patent Number: 4,683,278
[45] Date of Patent: Jul. 28, 1987

[54] ALKENYL ORGANOPOLYSILOXANE AND CURABLE COMPOSITION THEREFROM

[75] Inventor: Toshio Suzuki, Ichihara, Japan

[73] Assignee: Toray Silicone Co., Ltd., Tokyo, Japan

[21] Appl. No.: 897,488

[22] Filed: Aug. 18, 1986

Related U.S. Application Data

[62] Division of Ser. No. 703,639, Feb. 21, 1985, Pat. No. 4,631,321.

[30] Foreign Application Priority Data

Feb. 28, 1984 [JP] Japan ............................. 59-37112

[51] Int. Cl.$^4$ ............................................. C08G 77/20
[52] U.S. Cl. ................................... 528/32; 525/277; 525/278; 528/15; 528/18; 528/31
[58] Field of Search ................ 525/277, 278; 528/32

[56] References Cited

U.S. PATENT DOCUMENTS 3,491,165  1/1970  Seyfried et al. ................. 260/825
3,532,649  10/1970  Smith et al. ..................... 260/18
4,476,166  10/1984  Eckberg ........................... 427/387
4,537,943  9/1985  Talcott ............................. 528/15

*Primary Examiner*—Wilbert J. Briggs, Sr.
*Attorney, Agent, or Firm*—Roger H. Borrousch

[57] ABSTRACT

Organopolysiloxanes which have end groups of the general formula

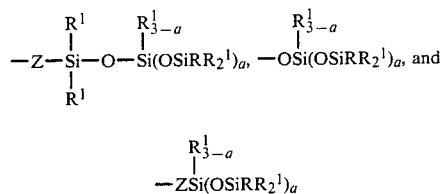

where R is alkenyl, Z is alkylene, $R^1$ is a monovalent organic group, and a is 2 or 3, when mixed with organohydrogensiloxane and a platinum catalyst cure to high strength products without the use of a reinforcing filler.

3 Claims, No Drawings

ALKENYL ORGANOPOLYSILOXANE AND CURABLE COMPOSITION THEREFROM

This is a divisional of co-pending application Ser. No. 703,639, filed on Feb. 21, 1985, now U.S. Pat. No. 4,631,321.

BACKGROUND OF THE INVENTION

Field of the Invention

The present invention provides an alkenyl organopolysiloxane and a curable organopolysiloxane composition. More specifically, the present invention provides a curable organopolysiloxane whose cured product has a high physical strength in the absence of any addition of reinforcing fillers.

BACKGROUND INFORMATION

Curable organopolysiloxanes are known in the prior art which are composed of polysiloxane containing silicon-bonded vinyl groups, polysiloxane containing silicon-bonded hydrogen atoms, and a platinum catalyst. However, the cured products of such curable organopolysiloxanes generally exhibit the drawback of poor physical strength values for the tensile strength, tear strength, and hardness. For this reason, a reinforcing filler or reinforcing silicone resin is added to such a composition in order to improve the physical strength of the cured product with the resulting drawback of a too high viscosity and process complications.

Various methods were examined by the present inventor in order to eliminate the above-mentioned drawbacks in the prior art and a curable organopolysiloxane composition was discovered as a result whose cured product has a high physical strength in the absence of addition of any reinforcing filler.

SUMMARY OF THE INVENTION

This invention relates to a curable organopolysiloxane composition comprising (a) organopolysiloxane in which at least the molecular chain ends possess groups with a general formula selected from the group consisting of

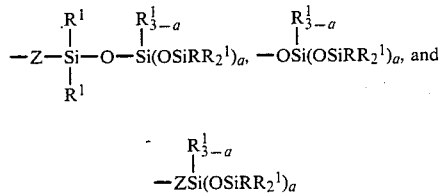

wherein R is an alkenyl group, $R^1$ is a monovalent organic group selected from the group consisting of alkyl, alkenyl, alkoxy, aryl, and halogenated alkyl, Z is an alkylene group, and a is 2 or 3, (b) organohydrogenpolysiloxane which contains at least two silicon-bonded hydrogen atoms per molecule, and (c) a catalytic quantity of platinum or a platinum-type compound, in said curable organopolysiloxane composition the blending ratio of (a) to (b) is such that the total alkenyl groups in (a) to total silicon-bonded hydrogen atoms in (b) is in a molar ratio of from 1:0.1 to 1:10.

This invention also relates to an organopolysiloxane comprising a polymer in which at least the molecular chain ends possess groups with a general formula selected from the group consisting of

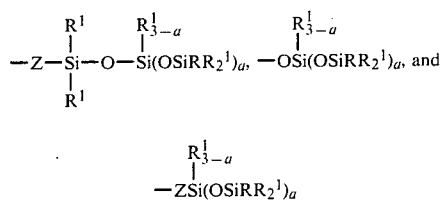

wherein R is an alkenyl group, $R^1$ is a monovalent organic group selected from the group consisting of alkyl, alkenyl, alkoxy, aryl, and halogenated alkyl, Z is an alkylene group, and a is 2 or 3.

DETAILED DESCRIPTION OF THE INVENTION

Component (a) is organopolysiloxane in which at least the molecular chain ends possess groups with a general formula selected from

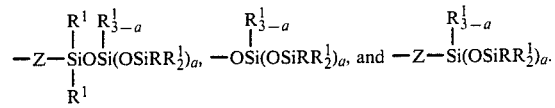

R in the above general formula is an alkenyl group such as vinyl, allyl, and propenyl. $R^1$ is a monovalent organic group such as alkyl groups such as methyl, ethyl, and propyl; alkenyl groups such as vinyl, allyl, and propenyl; alkoxy groups such as methoxy, ethoxy, propoxy, and methoxyethoxy; aryl groups such as phenyl; and halogenated alkyl groups. The subscript a is 2 or 3 and preferably 3. Z is an alkylene such as ethylene and propylene. The structure of the organopolysiloxane main chain of this component is arbitrary and it may be straight chain, branched chain, or network. The organic groups bonded to silicon in this organopolysiloxane include alkyl groups such as methyl, ethyl, and propyl; alkenyl groups such as vinyl, allyl, and propenyl; alkoxy groups such as methoxy, ethoxy, propoxy, and methoxyethoxy; aryl groups such as phenyl; and halogenated alkyl groups. In addition, small quantities of hydrogen atoms, hydroxyl groups, and organopolysiloxane groups, etc., can be present. Alkylene, silalkylene, and oxyalkylene groups can be present in the organopolysiloxane main chain of this component as long as they do not adversely affect the goal of the present invention. The molecular weight of this component is such that the viscosity must be 0.01 to 100 pa·s at 25° C. The instant organopolysiloxane can be produced by methods known in the prior art, for example, by the condensation of a silanol-terminated organopolysiloxane with an organosilicon compound with the general formula

where X is a hydrolyzable group or by the addition reaction of SiH-terminated organopolysiloxane with an organosilicon compound with a general formula selected from

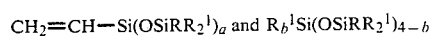

in the presence of a platinum catalyst. The subscript b in the above formula is 3 or 4.

Component (b) is organohydrogenpolysiloxane which possesses at least 2 silicon-bonded hydrogen atoms per molecule. The structure of this component is arbitrary and it may be straight chain, branched chain, cyclic, or network. Organic groups bonded to silicon in the instant organopolysiloxane include alkyl groups such as methyl, ethyl, and propyl; alkoxy groups such as methoxy, ethoxy, propoxy, and methoxyethoxy; aryl groups such as phenyl; and halogenated alkyl groups. The molecular weight of component (b) is such that the viscosity must be 0.0001 to 10 Pa·s at 25° C. Examples of component (b) are trimethylsilyl-terminated dimethylsiloxane-methylhydrogensiloxane copolymer, dimethylhydrogensilyl-terminated dimethylsiloxane-methylhydrogensiloxane copolymer, trimethylsilyl-terminated methylhydrogenpolysiloxane, dimethylhydrogensilyl-terminated methylhydrogenpolysiloxane, methylhydrogensiloxane-dimethylsiloxane cyclic copolymer, and organopolysiloxane consisting of $(CH^3)_2HSiO_{\frac{1}{2}}$ units and $SiO_2$ units.

The blending ratio of component (a) to component (b) must satisfy the condition that the total alkenyl groups in component (a) to the total silicon-bonded hydrogen atoms in component (b) has a molar ratio of from 1:0.1 to 1:10, preferably over 1:0.3 to 1:3 and more preferably over 1:0.6 to 1:1.5.

Component (c) is a catalyst which cures components (a) and (b) by an addition reaction and is platinum or a platinum-type compound. Examples thereof are finely particulate platinum, finely particulate platinum adsorbed on a carbon powder support, chloroplatinic acid, alcohol-modified chloroplatinic acid, chloroplatinic acid-olefin complexes, chloroplatinic acid-vinylsiloxane coordination compounds, platinum black, palladium, and rhodium catalysts. The quantity of catalyst to be employed depends on the type of catalyst and is arbitrary; however, it is generally 0.01 to 1000 ppm platinum element, palladium element or rhodium element based on the total weight of organopolysiloxane.

The composition of the present invention is produced by mixing components (a), (b), and (c). A known reaction retarder such as an acetylene compound or a nitrogen compound can be added to the composition of the present invention in order to provide working stability at room temperature.

Although the cured product of the composition of the present invention has a high strength even without adding any reinforcing fillers, an additive which imparts a much higher strength to the composition can be added. Examples of additives are silicas such as dry-process silica, wet-process silica, fine quartz powder, and diatomaceous earth; polysiloxanes constituted of $(CH_2=CH)(CH_3)_2SiO_{\frac{1}{2}}$ units and $SiO_2$ units; metal oxides such as titanium oxide, zinc oxide, iron oxide, and cerium oxide; the hydroxides of rare earth elements; carbon black; graphite; silicon carbide; mica; talc; and pigments.

The curing method is arbitrarily selected from among standing at room temperature, heating, and exposure to radiation.

According to the present invention, an organopolysiloxane cured product is produced which has a high physical strength without the addition of a reinforcing filler and which can be advantageously used in such applications as electric-electronic parts, fiber coating, silicone rubber for manufacturing molds, various rubber moldings, rubber for coating electric wire, release paper, and medical applications. In addition, when the blending ratio of component (a) to component (b) satisfies the condition that the total alkenyl groups in component (a) to the total silicon-bonded hydrogen atoms in component (b), has a molar ratio of 1:0.3 to 1:3, the resulting composition will generate little hydrogen gas during curing and it can thus be advantageously used in optical applications such as the coating of optical glass communication fibers.

The present invention will be explained using demonstrational examples. Parts and % in the examples denote weight parts and wt%, respectively. The viscosity was measured at 25° C. The tensile strength and hardness were measured by the methods of JIS K6301.

EXAMPLE 1

100 parts dimethylhydrogensilyl-terminated polydimethylsiloxane with a 0.25 Pa·s viscosity, 25 parts of a compound with the formula

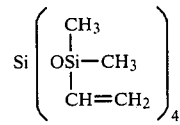

and 0.5 part of a 3% isopropyl alcohol solution of chloroplatinic acid were placed in a flask and then reacted at 150° C. for 2 hours. The unreacted components were then distilled under reduced pressure. The product polysiloxane, denoted below as polymer I, had a viscosity of 0.6 Pa·s. Analysis of the product shows that it was a mixture of polymer in which both ends were blocked with the compound of the above formula and dimers of the polymer. That is, all polymer terminals were blocked with groups with the formula

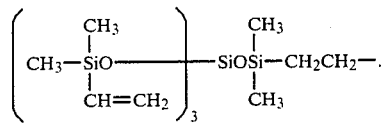

Polymer I contains 1.68% vinyl groups.

100 parts polymer I were thoroughly mixed with 8 parts trimethylsilyl-terminated dimethylsiloxane-methylhydrogensiloxane copolymer(dimethylsiloxane unit:methylhydrogensiloxane unit molar ratio=1:1, viscosity=0.01 Pa·s, denoted below as polymer II), 0.5 part of a 3% isopropyl alcohol solution of chloroplatinic acid and 0.01 part of 3-phenyl-1-butyne-3-ol to give a (Si—CH=CH₂ in polymer I):(SiH in polymer II) molar ratio of 1:0.96 and this was then cured at a temperature of 150° C. for 30 minutes. The cured product had a tensile strength of 8 kg/cm² and a hardness of 40. The hydrogen gas generated during the curing process was gas chromatographically analyzed and was determined to be 0.8 µL/g (at 25° C. and 1 atm).

COMPARISON EXAMPLE 1

A cured product was manufactured by the same method as described in Example 1 using 100 parts dimethylvinylsilyl-terminated polydimethylsiloxane with a viscosity of 0.6 Pa·s, 2.6 parts of polymer II of Example 1, 0.5 part of a 3% isopropyl alcohol solution of chloroplatinic acid, and 0.01 part 3-phenyl-1-butyne-3-ol. The resulting cured product had a tensile strength of 4 kg/cm² and a hardness of 29. Hydrogen gas generation was determined by the method described in Example 1 was found to be 350 μL/g (at 25° C. and 1 atm).

EXAMPLE 2

100 parts of polymer I of Example 1 were thoroughly mixed with 24.9 parts of the following organohydrogenpolysiloxane with a 0.02 Pa·s viscosity (denoted below as polymer III),

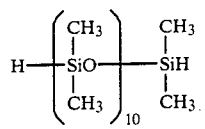

0.3 part of a 3% 2-ethylhexanol solution of chloroplatinic acid, and 0.01 part 3-methyl-1-butyne-3-ol to give a SiCH=CH₂:SiH molar ratio of 1.0:1.0 and this was then cured at an elevated temperature of 130° for 1 hour. The resulting cured product had a tensile strength of 5 kg/cm² and a hardness of 30. Hydrogen gas generation was determined by the same method as described in Example 1 and was found to be 0.2 μL/g (at 25° C. and 1 atm).

COMPARISON EXAMPLE 2

100 parts of an organopolysiloxane with a 0.6 Pa·s viscosity with the formula

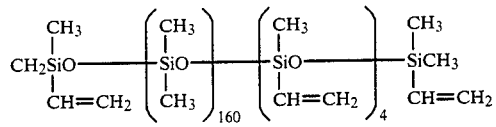

are thoroughly mixed with 19 parts polymer III of Example 2, and 0.3 part of a 3% 2-ethylhexanol solution of chloroplatinic acid and then processed by the same method as described in Example 1 to obtain a cured product. The cured product had a tensile strength of 2 kg/cm² and a hardness of 22. Hydrogen gas generation was determined by the same method as described in Example 1 and was found to be 15 μL/g (at 25° C. and 1 atm).

EXAMPLE 3

100 parts dimethylhydrogensilyl-terminated polydimethylsiloxane with a 0.6 Pa·s viscosity, 20 parts of a compound with the formula

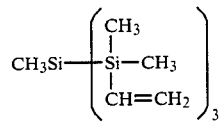

and 0.5 part of a 3% isopropyl alcohol solution of chloroplatinic acid were placed in a flask and then reacted at 160° C. for 2 hours. The unreacted components were distilled under reduced pressure. The polysiloxane product, denoted hereafter as polymer IV, had a viscosity of 1.1 Pa·s and its polymer terminals were all confirmed by analysis to be blocked by groups with the formula

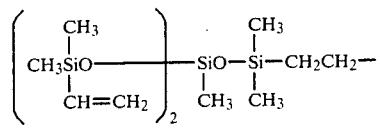

The vinyl group content was 0.70%.

100 parts of polymer IV were thoroughly mixed with 2.0 parts of a compound with the formula

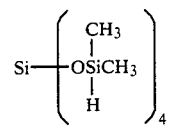

0.2 part of a 3% isopropyl alcohol solution of chloroplatinic acid, and 0.005 parts 3-methyl-1-butyne-3-ol wherein the resulting SiCH=CH₂:SiH molar ratio was 1.0:1.0 and this was then cured into a sheet at 150° C. for 20 minutes. The cured product had a tensile strength of 9 kg/cm² and a hardness of 35. Hydrogen gas generation was determined by the method described in Example 1 and was found to be 5.5 μL/g (at 25° C. and 1 atm).

COMPARISON EXAMPLE 3

100 parts dimethylvinylsilyl-terminated polydimethylsiloxane with a 1.0 Pa·s viscosity were thoroughly mixed with 1.1 parts of a compound with the formula

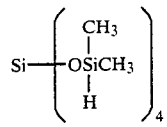

0.2 part of a 3% isopropyl alcohol solution of chloroplatinic acid, and 0.005 part 3-methyl-1-butyne-3-ol and this was then cured into a sheet by the method described in Example 3. The cured product had a tensile strength of 6 kg/cm² and a hardness of 24. Hydrogen gas generation was determined by the method described in Example 1 and was found to be 35 μL/g (at 25° C. and 1 atm).

EXAMPLE 4

100 parts dimethylhydroxylsilyl-terminated dimethylsiloxane-diphenylsiloxane copolymer (dimethylsiloxane unit:diphenylsiloxane unit molar ratio=90:10, viscosity=5.0 Pa·s) were mixed with 5 parts of a compound with the formula

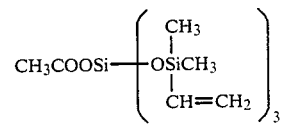

and 0.1 part dibutyltin diacetate catalyst at room temperature in the ambient for 6 hours, heated at 70° C. under reduced pressure to remove the acetic acid produced and then heated to 180° C. under reduced pressure to remove the unreacted material. The product polymer V was confirmed by analysis to be blocked at both ends by groups with the formula

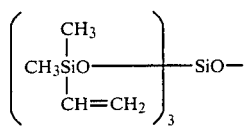

Its vinyl group content was 6.5% and its viscosity was 5.4 Pa·s.

100 parts polymer V were thoroughly mixed with 36 parts of a cyclic organohydrogenpolysiloxane with the formula

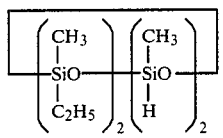

1 part of a 2% 2-ethylhexanol solution of chloroplatinic acid, and 0.01 part 3,5-dimethylhexyne-3-ol to give a SiCH=CH$_2$:SiH molar ratio of 1.0:1.0 and this was then cured into a sheet at an elevated temperature of 100° C. for 1 hour. The cured product had a tensile strength of 12 kg/cm$^2$ and a hardness of 12. Hydrogen gas generation was determined by the method described in Example 1 and was found to be 0.5 μL/g (at 25° C. and 1 atm).

COMPARISON EXAMPLE 4

100 parts dimethylvinylsilyl-terminated dimethylsiloxane-diphenylsiloxane copolymer (dimethylsiloxane unit:diphenylsiloxane unit molar ratio=90:10, viscosity=5.2 Pa·s) were thoroughly mixed with 12 parts of the cyclic organohydrogenpolysiloxane cited in Example 4, 1 part of a 2% 2-ethylhexanol solution of chloroplatinic acid, and 0.01 part 3,5-dimethylhexyne-3-ol and this was then heated at 100° C. for 1 hour. However, the mixture did not become rubber, but rather gelled and its tensile strength and hardness could not be measured.

That which is claimed is:

1. An organopolysiloxane comprising a polymer in which at least the molecular chain ends possess groups with a general formula selected from the group consisting of

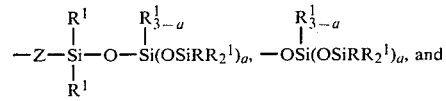

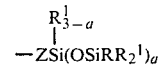

wherein R is an alkenyl group, R$^1$ is a monovalent organic group selected from the group consisting of alkyl, alkenyl, alkoxy, aryl, and halogenated alkyl, Z is an alkylene group, and a is 2 or 3.

2. An organopolysiloxane consisting essentially of a polymer in which at least the molecular chain ends possess groups with a general formula selected from the group consisting of

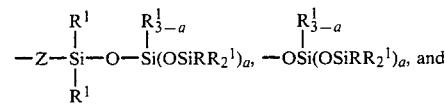

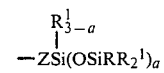

wherein R is an alkenyl group, R$^1$ is a monovalent organic group selected from the group consisting of alkyl, alkenyl, alkoxy, aryl, and halogenated alkyl, Z is an alkylene group, and a is 2 or 3.

3. An organopolysiloxane consisting of a polymer in which at least the molecular chain ends possess groups with a general formula selected from the group consisting of

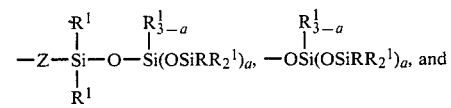

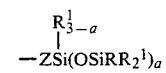

wherein R is an alkenyl group, R$^1$ is a monovalent organic group selected from the group consisting of alkyl, alkenyl, alkoxy, aryl, and halogenated alkyl, Z is an alkylene group, and a is 2 or 3.

* * * * *